(12) United States Patent
Mueller et al.

(10) Patent No.: US 7,741,248 B2
(45) Date of Patent: Jun. 22, 2010

(54) BOREHOLE TREATING SUBSTANCE CONTAINING ETHER CARBOXYLIC ACIDS

(75) Inventors: Heinz Mueller, Monheim (DE); Nadja Herzog, Korschenbroich (DE); Ansgar Behler, Bottrop (DE); Jens Hartmann, Bidnija (MT)

(73) Assignee: Emery Oleochemicals GmbH, Dusseldorf (DE)

( * ) Notice: Subject to any disclaimer, the term of this patent is extended or adjusted under 35 U.S.C. 154(b) by 835 days.

(21) Appl. No.: 10/566,225

(22) PCT Filed: Jul. 20, 2004

(86) PCT No.: PCT/EP2004/008089

§ 371 (c)(1),
(2), (4) Date: Aug. 3, 2006

(87) PCT Pub. No.: WO2005/012455

PCT Pub. Date: Feb. 10, 2005

(65) Prior Publication Data

US 2007/0049500 A1  Mar. 1, 2007

(30) Foreign Application Priority Data

Jul. 29, 2003  (DE) .................. 103 34 441

(51) Int. Cl.
*C09K 8/06* (2006.01)
*C09K 8/601* (2006.01)

(52) U.S. Cl. .................. 507/136; 507/137; 507/261

(58) Field of Classification Search .................. 507/136, 507/137, 261
See application file for complete search history.

(56) References Cited

U.S. PATENT DOCUMENTS

| | | | |
|---|---|---|---|
| 4,582,138 A * | 4/1986 | Balzer | 166/270.1 |
| 5,106,516 A | 4/1992 | Mueller et al. | |
| 5,232,910 A | 8/1993 | Mueller et al. | |
| 5,252,554 A | 10/1993 | Mueller et al. | |
| 5,254,531 A | 10/1993 | Mueller et al. | |
| 5,318,954 A | 6/1994 | Mueller et al. | |
| 5,318,956 A | 6/1994 | Mueller et al. | |
| 5,348,938 A | 9/1994 | Mueller et al. | |
| 5,403,822 A | 4/1995 | Mueller et al. | |
| 5,441,927 A | 8/1995 | Mueller et al. | |
| 5,461,028 A | 10/1995 | Mueller et al. | |
| 5,663,122 A | 9/1997 | Mueller et al. | |
| 5,755,892 A | 5/1998 | Herold et al. | |
| 5,846,601 A | 12/1998 | Ritter et al. | |
| RE36,066 E | 1/1999 | Mueller et al. | |
| 5,869,434 A * | 2/1999 | Mueller et al. | 507/110 |
| 6,022,833 A | 2/2000 | Mueller et al. | |
| 6,063,146 A | 5/2000 | Miller et al. | |
| 6,122,860 A | 9/2000 | Von Tapavicza et al. | |
| 6,165,946 A | 12/2000 | Mueller et al. | |
| 6,289,989 B1 | 9/2001 | Mueller et al. | |
| 6,326,514 B1 | 12/2001 | Klug et al. | |
| 6,350,788 B1 | 2/2002 | Herold et al. | |
| 6,596,670 B1 | 7/2003 | Mueller et al. | |
| 6,716,799 B1 | 4/2004 | Mueller et al. | |
| 6,806,235 B1 | 10/2004 | Mueller et al. | |
| 2007/0142234 A1 | 6/2007 | Mueller et al. | |
| 2007/0219097 A1 | 9/2007 | Mueller et al. | |
| 2007/0219098 A1 | 9/2007 | Mueller et al. | |
| 2008/0234145 A1 | 9/2008 | Mueller et al. | |

FOREIGN PATENT DOCUMENTS

| | | |
|---|---|---|
| EP | 0 374 672 B1 | 6/1990 |
| EP | 0 386 638 B1 | 3/1993 |
| EP | 0 382 070 B1 | 10/1993 |
| EP | 0 374 671 B1 | 3/1994 |
| EP | 0 472 557 B1 | 12/1994 |
| EP | 0 532 570 B1 | 2/1995 |
| EP | 0 642 561 B1 | 3/1995 |
| EP | 0 386 636 B2 | 12/1997 |
| EP | 0 765 368 B1 | 4/1999 |
| EP | 0 948 577 B1 | 10/1999 |
| EP | 1 061 064 A1 | 12/2000 |
| RO | 114 973 B | 9/1999 |
| WO | WO 99/04138 A1 | 1/1999 |
| WO | WO 99/33932 A1 | 7/1999 |

OTHER PUBLICATIONS

Boyd et al., "New Base Oil Used in Low-Toxicity Oil Muds", Journal of Petroleum Technology, (Jan. 1985), pp. 137-142.
Manual of Drilling Fluids Technology, "Stuck Pipe" Chapter, NL Baroid/NL Industries, Inc., Houston, Texas, (1985), pp. 1-14.

* cited by examiner

*Primary Examiner*—Timothy J. Kugel
*Assistant Examiner*—Atnaf Admasu
(74) *Attorney, Agent, or Firm*—Smith Moore Leatherwood LLP

(57) ABSTRACT

A well servicing composition containing an aqueous phase and an oil phase and an ether carboxylic acid of the formula:

$$RO(CH_2CH_2O)_x(CH_2CHR^1O)_yCH_2-COOX$$

wherein, R is a saturated or unsaturated, branched or unbranched alkyl or alkenyl group containing 6 to 22 carbon atoms, x is a number from 1 to 20 and y is 0 or a number from 1 to 20, provided that the sum of x and y is at least 1 and at most 25, $R^1$ is an alkyl group containing 1 to 4 carbon atoms and X comprises at least one member selected from the group consisting of a hydrogen atom, monovalent cations and polyvalent cations.

19 Claims, No Drawings

BOREHOLE TREATING SUBSTANCE CONTAINING ETHER CARBOXYLIC ACIDS

CROSS-REFERENCE TO RELATED APPLICATIONS

This application is filed under 35 U.S.C. §371 claiming priority from Application PCT/EP2004/008089 filed on Jul. 20, 2004, which claims priority from German patent application DE 103 34 441.1 filed on Jul. 29, 2003, the entire contents of each application are incorporated herein by reference.

FIELD OF THE INVENTION

This invention relates to additives for well servicing compositions and, more particularly, to emulsifiers for water-based emulsion drilling fluids and to drilling fluid systems containing these emulsifiers.

BACKGROUND OF THE INVENTION

It is known that drilling fluids for sinking wells in rock and bringing up the rock cuttings are flowable water- or oil-based systems that are thickened to a limited extent. Oil-based systems are acquiring increasing significance in practice and are used in particular in offshore drilling operations. Oil-based drilling fluids are generally used as so-called invert emulsion muds which consist of a 3-phase system: oil, water and fine-particle solids. Drilling fluids such as these are preparations of the w/o emulsion type, i.e. the aqueous phase is heterogeneously and finely dispersed in the continuous oil phase. A range of additives may be used for stabilizing the system as a whole and for establishing the required performance properties, including in particular emulsifiers and emulsifier systems, weighting agents, fluid loss additives, viscosity adjusters and optionally an alkali reserve. Further details can be found, for example, in the Article by P. A. Boyd et al., "New base oil used in low toxicity oil muds", Journal of Petroleum Technology, 1985, 137-142.

A key criterion for evaluating the usefulness of invert drilling fluids in practice are their rheological characteristics. Certain viscosity values have to be maintained in drilling fluid systems suitable for practical application. In particular, uncontrolled thickening and hence increases in the viscosity of the drilling fluid have to be strictly prevented because, otherwise, the pipe can become stuck during drilling (cf. Manual of Drilling Fluids Technology, NL Baroid/NL Inc. 1985, Chapter "Stuck Pipe") and can only be freed by expensive, time-consuming measures. In practice, therefore, suitable diluents are added to the drilling fluid systems before and also during drilling. It is known from the prior art that anionic surfactants from the group of fatty alcohol sulfates, fatty alcohol ether sulfates and alkyl benzenesulfonates are preferably used for this purpose. It has been found in practice, however, that although compounds of this type can effectively influence the rheology of the drilling fluids, problems can arise with diluents known from the prior art when drilling fluids are used at low external temperatures. This applies in particular at temperatures of 50° F. (10° C.) and lower. There is invariably an increase in viscosity which is difficult or impossible to control, even when known diluents are used.

In addition, it is important to ensure that the drilling fluid which is pumped into the ground is heated, for example, to temperatures of 150 to 250° F. (66 or 121° C.), depending on the depth, and—in the case of very deep wells—to temperatures of up to 350° F. (178° C.), although it is not always desirable for the rheology of the drilling fluid at high temperatures to be influenced at the same time. Instead, only selective influencing in the critical low temperature range is desirable in many cases.

In addition, all additives and auxiliaries used in offshore and onshore drilling fluid systems are expected to satisfy stringent biodegradability and toxicity requirements. Also, the ambient conditions prevailing during drilling operations, such as high temperatures, high pressures, changes in pH caused by the inrush of acidic gases, etc., impose high demands on the choice of possible components and additives.

If water-based drilling fluid systems in emulsion form are used, as is often the case today, the presence of emulsifiers is essential. A large number of suitable compounds are known to the expert, for example from the disclosure of EP 0 948 577, of which the technical teaching is confined to special temperature-dependent emulsions. However, a large number of emulsifiers suitable for use in drilling fluids are mentioned in that document, cf. the disclosure of paragraphs 0066 to 0076 of EP 0 948 577 B1.

The choice of emulsifiers for well servicing systems and, more particularly, drilling fluids is primarily directed at finding substances which lead to maximum stability of the emulsion, even under the extreme conditions of practical application, i.e. an increase in the viscosity of the drilling fluid and, more particularly, breaking of the emulsion should be strictly prevented. This applies in particular to emulsions of the water-in-oil type.

BRIEF DESCRIPTION OF THE INVENTION

It has now been found that the problem stated above can be solved by the use of certain carboxylic acid derivatives.

Accordingly, the present invention relates to the use of ether carboxylic acids corresponding to general formula (I):

$$RO(CH_2CH_2O)_x(CH_2CHR^1O)_yCH_2—COOX \quad (I)$$

in which R is a saturated or unsaturated, branched or unbranched alkyl or alkenyl group containing 6 to 22 carbon atoms, x is a number from 1 to 20 and y is 0 or a number from 1 to 20, with the proviso that the sum of x and y is at least 1 and at most 25, and $R^1$ is an alkyl group containing 1 to 4 carbon atoms and X is a hydrogen atom or a monovalent or polyvalent cation, in drilling fluids.

DETAILED DESCRIPTION OF THE INVENTION

Ether carboxylic acids as such have been known to experts for a long time. Their production is described, for example, in EP 1 061 064 A1, where a fatty alcohol is converted into an alcoholate, then reacted with alkylene oxides and alkylated with chloroacetic acid derivatives in the alkaline medium to form the end product.

In the context of the present invention, the ether carboxylic acids may be both ethoxylated and propoxylated; it may also be advantageous to have both ethylene oxide and propylene oxide groups in the molecule. The order or sequence of the groups is not critical to the invention. Accordingly, both compounds corresponding to formula (I), which contain ethylene oxide groups and propylene oxide groups in separated blocks, and products corresponding to formula (I), in which ethylene and propylene oxide groups are randomly distributed (known as random alkoxylates), may be used.

However, a preferred embodiment is characterized by the use of ether carboxylic acids corresponding to formula (I) which are free from propylene oxide groups. Accordingly, ether carboxylic acids corresponding to formula (I), in which the index y represents 0, are preferred. In another preferred embodiment, the ether carboxylic acids corresponding to formula (I) used as emulsifiers have a degree of alkoxylation x of 1 to 15, preferably 1 to 10 and more particularly 1 to 8. The alkyl groups are advantageously selected so that, in particular, straight-chain unsaturated compounds lead to particularly advantageous embodiments. The ether carboxylic acids corresponding to general formula (I) may be present as free acids or as salts in the presence of monovalent or polyvalent cations. According to the invention, particularly preferred cations are the ammonium cation and the alkali metal or alkaline earth meta cations. In another preferred embodiment, the ether carboxylic acids of formula (I) are used in the form of their salts.

The ether carboxylic acids corresponding to general formula (I) are preferably used as emulsifiers in drilling fluids, the drilling fluid having to contain at least one aqueous and one non-aqueous phase. In a particularly preferred embodiment, the ether carboxylic acids of formula (I) are used as emulsifiers in drilling fluids which form a water-in-oil or oil-in-water emulsion. In a most particularly preferred embodiment, the ether carboxylic acids of formula (I) are used for so-called invert drilling fluids where a water phase is "dispersely" emulsified in a continuous oil phase.

It can be of advantage to use the ether carboxylic acids according to the invention in such drilling fluids, in which case the oil phase of the drilling fluids is selected from esters of saturated or unsaturated, branched or unbranched monocarboxylic acids containing 1 to 24 carbon atoms and monohydric, linear or branched, saturated or unsaturated alcohols containing 1 to 24 carbon atoms. The ether carboxylic acids are also preferably used in drilling fluids of which the oil phase contains linear α-olefins, internal olefins or paraffins. It can also be of advantage to use oil phases consisting of mixtures of the preferred carrier fluids described above.

The drilling fluids according to the invention should contain the ether carboxylic acids in quantities of preferably at least 0.05% by weight, based on the total weight of the drilling fluid. In a preferred embodiment, the ether carboxylic acids are used in quantities of 0.1 to at most 25% by weight, preferably 0.1 to 10% by weight and more particularly 0.1 to 5% by weight, based on the weight of the drilling fluid as a whole, in order to be able optimally to develop their effect according to the invention. The range from 0.1 to 1.0% by weight is most particularly preferred. Based on the weight of the oil phase alone, the ether carboxylic acids should preferably be used in a quantity of 1 to 15% by weight, the range from 1 to 10% by weight being particularly preferred.

The use of the ether carboxylic acids according to the invention leads to an improvement in the electrical stability of the emulsified systems, particularly in the presence of seawater. The filtrate properties of corresponding drilling fluids are also clearly improved by addition of the ether carboxylic acids according to the invention. Another positive effect of using the ether carboxylic acids in drilling fluids is that the drilling fluids retain their rheological properties, even in the event of contamination, and do not, for example, undergo an unfavorable increase in yield point. This is another aspect of the positive effect, particularly in the case of invert drilling fluid systems contaminated with solids and/or seawater.

The present invention also relates to well servicing compositions, more particularly drilling fluids, flowable and pumpable at 5 to 20° C. which are based either on a continuous oil phase, optionally in admixture with a limited quantity of a disperse aqueous phase (w/o invert type), or on an o/w emulsion with a disperse oil phase in the continuous aqueous phase and which optionally contain dissolved and/or dispersed standard auxiliaries, such as thickeners, emulsifiers, fluid loss additives, wetting agents, fine-particle weighting agents, salts, alkali reserves and/or biocides, characterized in that, in their oil phase, they contain compounds selected from the following classes:

(a) carboxylic acid esters corresponding to formula (II):

where R' is a saturated or unsaturated, linear or branched alkyl group containing 5 to 23 carbon atoms and R" is an alkyl group containing 1 to 22 carbon atoms, which may be saturated or unsaturated, linear or branched, (b) linear or branched olefins containing 8 to 30 carbon atoms, (c) water-insoluble, symmetrical or nonsymmetrical ethers of monohydric alcohols of natural or synthetic origin which may contain 1 to 24 carbon atoms, (d) water-insoluble alcohols corresponding to formula (III):

where R''' is a saturated, unsaturated, linear or branched alkyl group containing 8 to 24 carbon atoms, (e) carbonic acid diesters, (f) paraffins, g) acetals, these compositions containing compounds corresponding to formula (I).

These compositions contain oils from the above-mentioned groups either individually or in the form of mixtures with one another in the continuous oil phase.

In a particularly preferred embodiment, the oil phase is formed by the carboxylic acid esters of formula (II), more particularly those described in EP 0 374 672 or EP 0 386 636. In another particularly preferred embodiment, the compounds of formula (I) are used in invert drilling fluid emulsions of which the oil phase contains esters of formula (II), in which R' is an alkyl group containing 5 to 21 carbon atoms, preferably 5 to 17 carbon atoms and more particularly 11 to 17 carbon atoms. Particularly suitable alcohols in such esters are based on branched or unbranched alcohols containing 1 to 8 carbon atoms, for example on methanol, isopropanol, isobutanol or 2-ethylhexanol. Alcohols containing 12 to 18 carbon atoms are also preferred. Particularly preferred esters are saturated $C_{12-14}$ fatty acid esters or unsaturated $C_{16-18}$ fatty acids with isopropyl, isobutyl or 2-ethylhexanol as the alcohol component. 2-Ethylhexyl octanoate is also suitable. Other suitable esters are acetic acid esters, particularly acetates of $C_{8-18}$ fatty alcohols. Oil phases such as these—normally called carrier fluids—are known, for example, from earlier Cognis patents/patent applications, cf. in particular European patent applications EP 0 374 671, EP 0 374 672, EP 0 382 070, EP 0 386 638. Oil phases based on linear olefins are also known to the expert, cf. EP-A-0 765 368. Branched esters (a) as disclosed, for example, in WO 99/33932 (Chevron) or in EP 0 642 561 (Exxon) are also suitable carrier fluids in the process according to the invention; the esters disclosed therein are part of the disclosure of the present invention. Mixtures of these preferred esters with one another are also preferred.

In another preferred embodiment, the oil phase contains α-olefins or internal olefins (IOs) or poly-α-olefins (PAOs) as component (b). The IOs or IO mixtures present in the oil phase according to the invention then contain corresponding compounds with 12 to 30 carbon atoms in the molecule, preferably 14 to 24 carbon atoms and more particularly up to 20 carbon atoms in the molecule. If α-olefins are present as the oil phase, α-olefins based on fatty acids containing 12 to 18 carbon atoms are preferably used, saturated α-olefins being particularly preferred. These preferred mixtures are the subject of applicants' EP 0 765 368 A1.

Other suitable constituents of the oil phase are water-insoluble symmetrical or nonsymmetrical ethers (c) of monohydric alcohols of natural or synthetic origin, the alcohols containing from 1 to 24 carbon atoms. Corresponding drilling fluids are the subject of European patent application EP 0 472 557. Water-soluble alcohols of group (d) can also be preferred constituents of the oil phase for the purposes of the present invention. The same applies to carbonic acid diesters (e) according to European patent application EP 0 532 570. These compounds can make up the oil phase as a whole or parts thereof. Paraffins (f) and/or acetals (g) may also be used as constituents of the oil phase.

Mixtures of compounds (a) to (g) with one another may also be used. In a preferred embodiment, at least 50% by weight of the oil phase of the emulsions according to the invention consists of such preferred compounds (a) to (g), systems in which 60 to 80% and more particularly 100% by weight of the oil phase consists of compounds (a) to (g) or mixtures thereof being particularly preferred.

The oil phases themselves then preferably have flash points above 85° C. and preferably above 100° C. They are formulated in particular as invert drilling fluids of the w/o type and preferably contain the disperse aqueous phase in quantities of about 5. In water-based o/w emulsion fluids, the quantity of disperse oil phase is in the range from about 1 to 50% by weight and preferably in the range from about 8 to 50% by weight. The continuous oil phases of such drilling fluids according to the invention have a Brookfield (RVT) viscosity at 0 to 5° C. of below 50 mPa·s and preferably not above 40 mPa·s. The pH of the fluids is preferably adjusted to a value in the range from about neutral to moderately basic and, more particularly, to a value in the range from about 7.5 to 11; the use of lime as an alkali reserve can be particularly preferred.

Water is also a constituent of the described drilling fluids. The water is preferably present in the invert emulsions in quantities of at least about 0.5% by weight. In a preferred embodiment, however, the invert emulsions contain at least 5 to 10% by weight of water. The water in drilling fluid systems of the type described herein always contains quantities of electrolytes to equalize the osmotic gradient between the drilling fluid and the formation water, calcium and/or sodium salts representing the preferred electrolytes. $CaCl_2$ in particular is commonly used. However, other salts from the group of alkali metals and/or alkaline earth metals, for example potassium acetates and/or formates, are also suitable.

According to the invention, the ether carboxylic acids of formula (I) are preferably used as emulsifiers in drilling fluid systems which, based on the liquid phase as a whole, contain 10 to 30% by weight water and hence 90 to 70% by weight of the oil phase. On account of the high percentage of dispersed solids in invert drilling fluids, reference is not made here to the weight of the fluid as a whole, i.e. water; oil and solid phases. The ether carboxylic acids of formula (I) are oil-soluble and, accordingly, are predominantly present in the oil phase and the interfaces thereof with the water phase.

Other preferred mixing ratios are 80% by weight oil phase to 20% by weight water phase. The drilling fluids according to the invention may also contain other typical additives and auxiliaries such as, in particular, other emulsifiers, weighting agents, fluid loss additives, thickeners and alkali reserves, more particularly lime (=$Ca(OH)_2$), and also biocides and so-called wetting agents which improve the wettability of surfaces.

Emulsifiers suitable for use in practice are systems which are suitable for forming the required w/o emulsions. Selected oleophilic fatty acid salts, for example based on amidoamine compounds, are particularly suitable. Emulsifiers of the type in question here are marketed as highly concentrated active-component preparations and may be used, for example, in quantities of about 2.5 to 5% by weight and, more particularly, in quantities of about 3 to 4% by weight, based on oil phase.

In practice, hydrophobicized lignite in particular is used as a fluid loss additive and, hence, in particular to form a dense coating in the form of a substantially liquid-impermeable film on the walls of the well. Suitable quantities are, for example, about 5 to 20 lb/bbl, preferably 5 to 10 lb/bbl and more particularly 5 to 8% by weight, based on the oil phase.

In drilling fluids of the type in question here, the thickener normally used is a cationically modified fine-particle bentonite which may be used in particular in quantities of about 8 to 10 and preferably 2 to 5 lb/bbl or in the range from 1 to 4% by weight, based on oil phase. The weighting agent normally used to establish the necessary pressure equilibrium is barite ($BaSO_4$), of which the quantities added are adapted to the particular conditions to be expected in the well. For example, the specific gravity of the drilling fluid can be increased by addition of barite to values of up to about 2.5 and preferably in the range from about 1.3 to 1.6. Another suitable weighting agent is calcium carbonate.

In a preferred embodiment, free, saturated or unsaturated fatty acids with the general formula R—COOH, in which R represents alkyl or alkenyl groups containing 5 to 21 carbon atoms, are used in addition to the ether carboxylic acids corresponding to formula (I). These fatty acids should be present in quantities of at least 0.1% by weight, preferably at least 0.3% by weight and advantageously in the range from 0.5 to 10% by weight, based on the weight of the drilling fluid. A particularly preferred range is from 0.3 to 2.0% by weight. Based on the weight of the oil phase, the free fatty acids should preferably be used in quantities of 1.5 to 6% by weight. In another preferred embodiment, the free fatty acids are used in a ratio by weight of about 1:1, preferably 2:1 to at most 10:1 to the ether carboxylic acids corresponding to formula (I).

The use of the ether carboxylic acids according to the invention leads on the one hand to stable emulsions and, on the other hand, to an improvement in the filtrate values of the drilling systems. In addition, the rheology of the drilling fluid is positively influenced, even at low temperatures such as 10° C. and lower. It can be of advantage to use the ether carboxylic acids according to the present invention as sole emulsifiers in invert drilling fluid systems. However, mixtures of the ether carboxylic acids with other known emulsifiers may also be used. Emulsifiers capable of forming w/o emulsions are preferred for this purpose. Another advantageous property of the compounds of formula (I) is that their use in drilling fluids, more particularly in invert systems, improves, i.e. reduces, the viscosity of the drilling fluid whatever combination of additives or carrier fluids is used, this dilution effect preferably occurring when other oil-soluble surfactants, for example nonionic surfactants based on reaction products of fatty acid epoxides with ethylene oxide and/or propylene oxide, are used in addition to the compounds of formula (I). When combined with other surfactants, however, the compounds of formula (I) can also develop a dispersing effect, i.e.

in fully formulated drilling fluid systems, they improve the distribution of the solids, particularly at low temperatures.

EXAMPLES

Example 1

To test the technical teaching disclosed here, drilling fluids with the following general composition were prepared:

| | | |
|---|---|---|
| oil phase[1] | 173 | ml |
| water | 77 | ml |
| thickener[2] | 2 | g |
| emulsifier[3] | 8 | g |
| $Ca(OH)_2$ | 2 | g |
| fluid loss additive[4] | 7 | g |
| barium sulfate | 327 | g |
| $CaCl_2 \cdot 2\ H_2O$ | 27 | g |
| oil-to-water ratio | 70:30 | (v/v) |
| density | 14 | lb/gal (1.7 g/l) |

[1] $C_{16-18}$-α-olefin, isomerized (Chevron); density at 20° C.: 0.785 g/cm³, Brookfield (RVT) viscosity at 20° C. 5.5 mPa · s
[2] modified organophilic bentonite, Geltone II (Baroid)
[3] aminoamide
[4] modified lignite dust, Duratone HT (Baroid)

The constituents were mixed in the following order in a Hamilton mixer: oil phase, water, thickener, emulsifier, lime, fluid loss additive, barium sulfate and then the calcium chloride and, optionally, a contaminant (RevDust). The additive according to the invention, a saturated $C_{12-18}$ ether carboxylic acid according to formula (I), in which X is 2 to 5 and y is 0, was then added, after which the rheological characteristics of the fluids—plastic viscosity (PV), yield point (YP) and gel strength (gels 10″/′) after 10 seconds and 10 minutes—were determined with a Fann SR 12 rheometer (Fann). Electrical stability was also measured.

The drilling fluid was then tested in a Roller Oven (Baroid) for 16 hours at temperatures of 121° C. (250° F.) (after hot rolling=AHR and before hot rolling=BHR in the Table). The results are set out in Table 1; an invert drilling fluid with (B) and without (A) the additive according to the invention were tested. The additive according to the invention was added to the above general formulation in quantities of 1 g, the content of standard emulsifier being reduced to 7 g at the same time.

TABLE 1

| | | System No.: | | | |
|---|---|---|---|---|---|
| | | A BHR | AHR | B BHR | AHR |
| Hours rolled/aged | h | | 16 | | 16 |
| Hot roll temp. | ° F. | | 250 | | 250 |
| Static age temp. | ° F. | — | | — | |
| Electrical stab. | v | 190 | 210 | 350 | 240 |
| PV | cP | 29 | 27 | 28 | 26 |
| YP | lb/100 ft² | 21 | 18 | 12 | 6 |
| Gels 10″/10′ | lb/100 ft² | 10/11 | 7/8 | 7/8 | 6/7 |

It can be seen that the addition of ether carboxylic acids of formula (I) leads to much better electrical stability and to a lower viscosity.

Example 2

In another test, the invert drilling fluids were prepared and tested for their rheological properties in the same way as in Example 1. On this occasion, however, filter ash known as "RevDust" was also added in quantities of 35 g to determine the behavior of the drilling fluid in response to contamination by increased solids. Drilling fluid A contained 8 g of the standard emulsifier; drilling fluid B instead contained 8 g of the ether carboxylic acid according to the invention as in Example 2. The results are set out in Table 2.

TABLE 2

| | | System No.: | | | |
|---|---|---|---|---|---|
| | | A | AHR | B | AHR |
| Hours rolled/aged | h | | 16 | | 16 |
| Hot roll temp. | ° F. | | 250 | | 250 |
| Static age temp. | ° F. | — | | — | |
| PV | cP | | 49 | | 49 |
| YP | lb/100 ft² | | 34 | | 6 |
| Gels 10″/10′ | lb/100 ft² | | 13/27 | | 3/3 |

Example 3

Invert drilling fluids were prepared and tested in the same way as in Example 1. However, drilling fluid (A) contained 8 g of the standard emulsifier, whereas drilling fluid (B) contained 2 g of the ether carboxylic acid according to the invention and only 4 g of the standard emulsifier. A mixture of the α-olefin described in Example 1 and a fatty acid ester based on $C_{8-18}$ fatty acids with 2-ethyl hexanol was used as the oil phase.

In addition to the rheological characteristics, the filtrate values were also determined using a Fann HTHP (high-temperature, high-pressure) model. The results are set out in Table 3.

TABLE 3

| | | System No.: | | | |
|---|---|---|---|---|---|
| | | A BHR | AHR | B BHR | AHR |
| Hours rolled/aged | h | | 16 | | 16 |
| Hot roll temp. | ° F. | | 250 | | 250 |
| Static age temp. | ° F. | — | | — | |
| PV | cP | 34 | 34 | 35 | 29 |
| YP | lb/100 ft² | 63 | 45 | 29 | 9 |
| Gels 10″/10′ | lb/100 ft² | 28/32 | 20/24 | 11/13 | 5/6 |
| HTHP total | ml | | 3.2 | | 2.4 |
| HTHP water | ml | | — | | — |
| HTHP oil | ml | | 3.2 | | 3.4 |
| HTHP temp. | ° F. | | 250 | | 250 |

Example 4

Three invert drilling fluids were prepared and tested in the same way as in Example 1. System (A) contained 8 g of the standard emulsifier while system (B) contained 2 g of the ether carboxylic acid according to the invention comprising 2 mol ethylene oxide per mol acid and 4 mol of an unsaturated fatty acid (low-erucic rapeseed oil fatty acid, OMC 392, Cognis) and fluid (C) contained 3 g of ether carboxylic acid and 5 g of unsaturated fatty acid OMC 392 in place of the standard emulsifier. The results of the measurement are set out in Table 4.

TABLE 4

|  |  | System No.: | | | | |
| --- | --- | --- | --- | --- | --- | --- |
|  |  | A BHR | AHR | B BHR | AHR | C |
| Hours rolled/aged | h |  | 16 |  | 16 | 16 |
| Hot roll temp. | ° F. |  | 250 |  | 250 | 250 |
| Static age temp. | ° F. |  |  |  |  |  |
| PV | cP | 29 | 27 | 32 | 25 | 31 | 27 |
| YP | lb/100 ft² | 21 | 18 | 16 | 10 | 11 | 2 |
| Gels 10"/10' | lb/100 ft² | 10/11 | 7/8 | 10/13 | 7/7 | 6/7 | 3/4 |

Example 5

A drilling fluid was prepared in the same way as in Example 1. Drilling fluid B according to the invention contained 6 g of a reaction product of a $C_{12-16}$-epoxide with ethylene glycol (Epicol G 246, Cognis) and 2 g of the ether carboxylic acid according to the invention. 8 g of the standard emulsifier were again used in the comparison drilling fluid A. Each of the drilling fluids was aged at 150° F. The results of the measurement are set out in Table 5.

TABLE 5

|  |  | System No.: | | | |
| --- | --- | --- | --- | --- | --- |
|  |  | A BHR | AHR | B BHR | AHR |
| Hours rolled/aged | h |  | 16 |  | 16 |
| Hot roll temp. | ° F. |  | 150 |  | 150 |
| Static age temp. | ° F. |  | — |  | — |
| Electrical stab. | V | 450 | 320 | 700 | 400 |
| PV | cP | 25 | 23 | 26 | 25 |
| YP | lb/100 ft² | 18 | 17 | 17 | 9 |
| Gels 10"/10' | lb/100 ft² | 7/9 | 7/9 | 6/8 | 5/6 |

Fluid B according to the invention has higher electrical stability than the comparison fluid.

Example 6

Three invert drilling fluids based on a paraffin oil as the oil phase were prepared. Filter ash (RevDust) was added as an additional solid to each fluid. The fluids were aged for 16 hours at 65° C. in the manner described above. The oil-to-water ratio was 80:20. The rheological characteristics were measured at 8° C. The results in Table 6 show that, even under these conditions, the addition of the compounds of formula (I) positively influences the rheology of the drilling.

TABLE 6

| Paraffin oil | g |  | 164.4 | 164.4 | 164.4 |
| --- | --- | --- | --- | --- | --- |
| Ether carboxylic acid 2 EO | g |  | # | 0.8 | 1.1 |
| Water | g |  | 51.1 | 51.1 | 51.1 |
| CaCl₂•2H₂O | g |  | 23.6 | 23.6 | 23.6 |
| Thickener[1] | g |  | 2.1 | 2.1 | 2.1 |
| Lime | g |  | 4.21 | 4.21 | 4.21 |
| Primary emulsifier[2] | g |  | 4.21 | 4.21 | 4.21 |
| Fatty acid mixture[3] | g |  | 1.05 | 1.05 | 1.05 |
| Fluid loss reducer[4] | g |  | 4.91 | 4.91 | 4.91 |
| Barium sulfate | g |  | 342.1 | 342.1 | 342.1 |
| RevDust | g |  | 45 | 45 | 45 |

TABLE 6-continued

|  |  | System No. | | |
| --- | --- | --- | --- | --- |
|  |  | A AHR | B AHR | C AHR |
| PV | cP | 125 | 122 | 120 |
| YP | lb/100 ft² | 26 | 22 | 20 |
| Gels 10"/10' | lb/100 ft² | 10/17 | 5/8 | 4/7 |

Paraffin oil: d (20° C.) = 0.835 g/cm³, V (20° C.) = 6.2 mm²s/s
[1] 73% oleic acid; 8% linoleic acid and 19% unsaturated fatty acids
[2] aminoamide
[3] modified organophilic bentonite, Geltone II, (Baroid)
[4] lignite dust

What is claimed is:

1. A well servicing composition flowable and pumpable at 5° to 20° C. comprising a continuous oil phase in admixture with a quantity of a disperse aqueous phase of a w/o invert type which optionally contains at least one dissolved auxiliary, dispersed auxiliary, or combinations thereof selected from the group consisting of thickeners, fluid loss additives, wetting agents, fine-particle weighting agents, salts, alkali reserves and biocides, wherein, the composition contains the ether carboxylic acid of compound of formula:

$$RO(CH_2CH_2O)_x(CH_2CHR^1O)_yCH_2\text{—}COOX \qquad (I)$$

wherein, R is a saturated or unsaturated, branched or unbranched alkyl or alkenyl group containing 6 to 22 carbon atoms, x is a number from 1 to 20 and y is 0 or a number from 1 to 20, provided that the sum of x and y is at least 1 and at most 25, $R^1$ is an alkyl group containing 1 to 4 carbon atoms and X comprises at least one member selected from the group consisting of a hydrogen atom, monovalent cations and polyvalent cations wherein the oil phase comprises at least one member selected from the group consisting of
   (a) carboxylic acid esters of formula: R'—COO—R" (II) where R' is a saturated or unsaturated, linear or branched alkyl group containing 5 to 23 carbon atoms and R" is an alkyl group containing 1 to 22 carbon atoms, which may be saturated or unsaturated, linear or branched,
   (b) α-olefins, internal olefins, poly-α-olefins, or combinations thereof,
   (c) water-insoluble, symmetrical or nonsymmetrical ethers of monohydric alcohols of natural or synthetic origin which contain 1 to 24 carbon atoms,
   (d) water-insoluble alcohols of formula: R'''—OH (III) where R''' is a saturated, unsaturated, linear or branched alkyl group containing 8 to 24 carbon atoms,
   (e) carbonic acid diesters,
   (f) paraffins, and
   (g) acetals.

2. The well servicing composition of claim 1, which contains at least one aqueous phase and one oil phase, wherein an emulsifier comprises the ether carboxylic acid of formula (I).

3. The well servicing composition of claim 1, comprising a water-in-oil or oil-in-water emulsion wherein said emulsifier comprises the ether carboxylic acid of formula (I).

4. The well servicing composition of claim 3 comprising from 1% to 15% by weight of the ether carboxylic acid based on the weight of the oil phase.

5. The well servicing composition of claim 1 comprising: a water-based emulsion system which contains at least one ester of saturated or unsaturated, branched or unbranched monocarboxylic acids containing 1 to 24 carbon atoms with monohydric, linear or branched, saturated or unsaturated alcohols containing 1 to 24 carbon atoms in an oil phase.

6. The well servicing composition of claim 1, comprising a drilling fluid system which contains at least one member selected from the group consisting of linear alpha-olefins, internal olefins, and paraffins in the oil phase.

7. The well servicing composition of claim 1, wherein the ether carboxylic acid of formula (I), comprises an ether carboxylic acid in which y is 0.

8. The well servicing composition of claim 1, wherein the ether carboxylic acid of formula (I), comprises an ether carboxylic acid in which x is a number from 1 to 15.

9. The well servicing composition of claim 8, wherein y is 0.

10. The well servicing composition of claim 1, wherein the ether carboxylic acid of formula (I) is present in quantities of 0.1 to 25% by weight, based on the weight of the well servicing composition.

11. The well servicing composition of claim 1, wherein the well servicing composition additionally comprises free fatty acids.

12. The well servicing composition of claim 1, wherein the ether carboxylic acid of-formula (I) comprises an ether carboxylic acid wherein x is a number of from 1 to 10.

13. The well servicing composition of claim 1, wherein the ether carboxylic acid of formula (I) comprises an ether carboxylic acid wherein x is a number of from 1 to 8.

14. The well servicing composition of claim 1, wherein the ether carboxylic acid of formula (I) is present in a quantity of from 0.1 to 10% by weight.

15. The well servicing composition of claim 1, wherein the ether carboxylic acid of formula (I) is present in a quantity of from 0.1 to 5% by weight.

16. The well servicing composition of claim 1, wherein the ether carboxylic acid of formula (I) comprises an ether carboxylic acid present as a salt.

17. The well servicing composition of claim 1 comprising a liquid phase containing from 10% to 30% water and from 70% to 90% oil based on the liquid phase as a whole.

18. The well servicing composition of claim 1, wherein (b) comprises compounds containing 12 to 30 carbon atoms in the molecule.

19. The well servicing composition of claim 1, wherein said oil phase comprises at least 50% by weight of the oil phase of a mixture of compounds (a) to (g).

* * * * *